Figure 1:
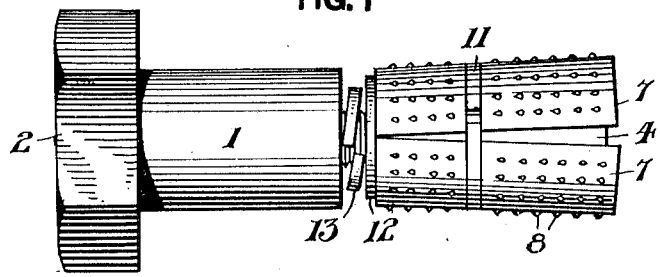

P. VERES.
EXPANSIBLE BOLT.
APPLICATION FILED DEC. 26, 1911.

1,035,277.

Patented Aug. 13, 1912.

WITNESSES

INVENTOR
P. Veres
BY
ATTORNEYS

UNITED STATES PATENT OFFICE.

PAUL VERES, OF CLEVELAND, OHIO.

EXPANSIBLE BOLT.

1,035,277.  Specification of Letters Patent.  Patented Aug. 13, 1912.

Application filed December 26, 1911. Serial No. 667,700.

*To all whom it may concern:*

Be it known that I, PAUL VERES, a subject of the King of Hungary, residing at Cleveland, in the county of Cuyahoga and State of Ohio, have invented certain new and useful Improvements in Expansible Bolts, of which the following is a specification, reference being had therein to the accompanying drawing.

This invention relates to an expansible bolt, and the primary object of my invention is to furnish a bolt with jaws that can be easily and quickly expanded to lock the nut of the bolt in an opening or socket provided therefor in a piece of material, the jaws being arranged whereby they will normally remain in engagement with the bolt even though the bolt is not in use.

A further object of my invention is to provide a bolt of the above type consisting of comparatively few parts that are durable and highly efficient for the purposes for which they are intended.

With the above and other objects in view, the invention resides in the novel construction, combination and arrangement of parts to be hereinafter specifically described and then claimed.

Reference will now be had to the drawing, wherein:—

Figure 2:
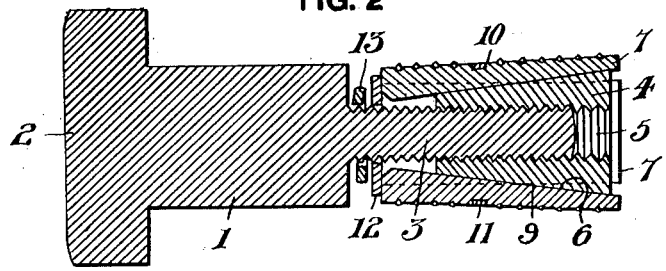
Figure 3:
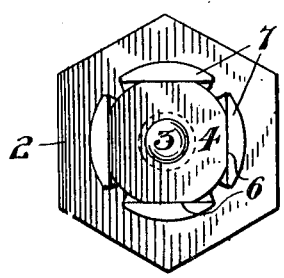
Figure 4:
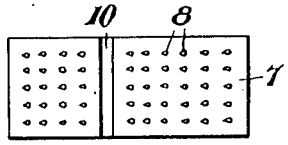
Figure 5:
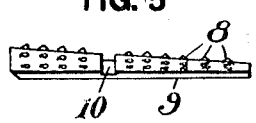
Figure 6:
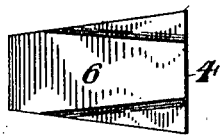

Figure 1 is a side elevation of the bolt, Fig. 2 is a longitudinal sectional view of the same, Fig. 3 is an end view of the bolt, Fig. 4 is a top plan of a detached jaw, Fig. 5 is a side elevation of the same, and Fig. 6 is a plan of a nut used in connection with the bolt.

A bolt in accordance with this invention comprises a cylindrical body 1 having one end thereof provided with a head 2 and the opposite end with a stem 3 that is exteriorly screw threaded and of less diameter than the body 1.

Screwed upon the stem 3 is a conical-shaped nut 4 having a longitudinal bore 5 that has the walls thereof screw threaded to receive the stem 3. The conical-shaped nut 4 is provided with equally spaced flat faces 6 inclining from the large end of the nut 4 to the small end thereof.

Arranged upon the flat faces 6 of the nut 4 are jaws 7 that are rectangular in plan, said jaws having rounded outer faces provided with prongs 8 and flat inner faces 9 engaging the flat faces of the nut 4. The jaws 7 gradually taper and the large ends of the jaws are positioned in proximity to the end of the body 1. The outer sides of the jaws 7 are provided with transverse grooves 10 and engaging in said grooves is a split resilient band or ring 11 that retains the jaws 7 normally in engagement with the nut 4.

Prior to arranging the nut 4 and the jaws 7 upon the stem 3, a washer 12 is placed upon the stem and interposed between the washer 12 and the body 1 is a nut locking device 13 of the "Verona" type, consisting of a split washer that has the ends thereof off-set relatively to each other.

With the nut 4 adjusted to the outer end of the stem 3, the jaws 7 are in a retracted position and the circumference of said jaws is less than the diameter of the body 1. The end of the bolt can then be inserted in the opening or socket in which it is to be anchored, and by screwing upon the bolt, the nut 4 is screwed on to the stem 3 toward the body 1 and the jaws 6 and 7 are expanded by the inner ends thereof contacting with the washer 12. The tension of the nut locking device against the washer 12 binds the jaws 7 upon the nut 4 and prevents the nut from accidentally rotating. The jaws 7, through the medium of the prongs 8, frictionally engage the opening or socket in which the bolt is mounted, preventing accidental displacement of the bolt.

It is thought that the operation and utility of the expansible bolt will be apparent without further description, and while in the drawing there is illustrated a preferred embodiment of the invention, it is to be understood that the structural elements are susceptible to such variations as fall within the scope of the appended claim.

What I claim is:—

In an expansible bolt, a bolt body having one end thereof provided with a head, an exteriorly screw threaded stem carried by the opposite end of said body and of less diameter than said body, a conical-shaped nut screwed upon said stem and having flat faces, tapering jaws having the outer sides thereof provided with prongs, a split band retaining said jaws in engagement with said nut, a washer arranged upon said stem between the inner end of said jaws and the end of said body, and a nut locking device interposed between the end of said body and said washer.

In testimony whereof I affix my signature in the presence of two witnesses.

PAUL VERES.

Witnesses:
 FRED L. THOMPSON,
 STEPHEN VURA.